(12) United States Patent
Wang et al.

(10) Patent No.: US 6,184,906 B1
(45) Date of Patent: Feb. 6, 2001

(54) MULTIPLE PIPELINE MEMORY CONTROLLER FOR SERVICING REAL TIME DATA

(75) Inventors: Chun Wang, Toronto; Raymond Li, Markham; Adrian Hartog, Toronto; Daniel Gudmundson, Newmarket, all of (CA)

(73) Assignee: ATI Technologies, Inc., Thornhill (CA)

( * ) Notice: Under 35 U.S.C. 154(b), the term of this patent shall be extended for 0 days.

(21) Appl. No.: 08/885,335

(22) Filed: Jun. 30, 1997

(51) Int. Cl.[7] ...................................................... G06F 13/16
(52) U.S. Cl. .......................... 345/521; 345/506; 711/151; 711/158
(58) Field of Search ..................................... 345/521, 506, 345/512, 302; 711/147, 151, 158, 169; 395/729, 731, 732; 710/241, 243, 244

(56) References Cited

U.S. PATENT DOCUMENTS

| | | | | |
|---|---|---|---|---|
| 5,649,206 | * | 7/1997 | Allen | 711/151 |
| 5,752,010 | * | 5/1998 | Herbert | 345/521 |
| 5,822,758 | * | 10/1998 | Loper et al. | 711/151 |

* cited by examiner

Primary Examiner—Raymond J. Bayerl
Assistant Examiner—Sy D. Luu
(74) Attorney, Agent, or Firm—Markison & Reckamp, P.C.

(57) ABSTRACT

A multiple pipeline memory controller has a plurality of two stage pipeline processors dedicated to separately process real time video capture and display refresh input request signals. A separate pipeline processor processes non-real time input signals. The multiple pipeline design reduces memory access latency and improves throughput of data in display FIFO memory to effect improved resolution. The multiple pipeline memory controller can be integrated in a video graphics controller (VGC).

21 Claims, 4 Drawing Sheets

MULTIPLE PIPELINE MEMORY CONTROLLER FOR SERVICING REAL TIME DATA

The invention relates generally to memory controllers for servicing real time data and more particularly to memory controllers for use in video graphic control cards or telecommunication units that require real time data capture and processing.

BACKGROUND OF THE INVENTION

Video graphics controllers (VGC's) are continually being required to manage and control more complex and additional information for display on computer screens. The type of additional bandwidth of information can significantly reduce image resolution due to the inability of the VGC to obtain and route the information in a high speed and efficient manner. The problem is compounded when computers, in some cases, are also required to service both computer graphics information and television signaling information, such as in the case when the computer is required to display video signals.

Real time video information such as video signals from a cable television (CATV) broadcaster must be captured in real time or the information is lost. When a live television show is being sent to the computer, the VGC must capture and display the video in real time while also displaying overlaid graphics and servicing other requests from the central processing unit relating to other graphic display requirements such as the displaying of text. VGC's typically generate real time signal requests to store the incoming real time video image and data information in frame buffer memory such as Also, the display screen must be refreshed constantly to avoid flickering and other problems that limit resolution. Since the frame buffer memories are accessed through the same memory interface, a read/write request for graphics information competes with a read/write request for capturing the real time video information. When these requests occur at the same time, one of the real time requests must wait to be serviced. This can result in a loss of data or an unacceptable slow down in processing.

These problems become compounded where the display screens are higher resolution displays and when other graphic information such as graphical user interfaces and other graphics are overlaid with the video image information and the information is requested to be displayed at the same time. The more the VGC has to switch between the real time requests, the lower the resolution quality and the lower the system performance.

To help alleviate some of these problems, memory controllers in VGC's have employed a single multi-stage pipeline processing approach. Such memory controllers achieve relatively high speeds and allow for a single memory clock cycle read/write operation. However, these memory controllers typically have memory access latencies that can dramatically degrade the performance of real time requesters in the VGC's. Extrinsic memory access latencies in such VGC's can be a large number greater than 10 clock cycles and can be 21 clock cycles. With the increasing real time requirements and additional non-real time requirements, these memory controllers with a great number of memory access latencies can not offer the high speed and high performance control necessary to adequately accommodate the increasing real time processing demands and complexity.

Consequently, there exists a need for a memory controller for servicing real time data that can more effectively accommodate multiple real time memory requests. It would also be advantageous to have an integrated VGC chip that includes a memory controller that has improved memory access latency for handling both real time video capture requests and real time display requests while also effectively accommodating non-real time requests. It would also be advantageous if the memory controller allowed for use of the same size CRT controller FIFO to help reduce costs of the VGC.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

Figure 1:
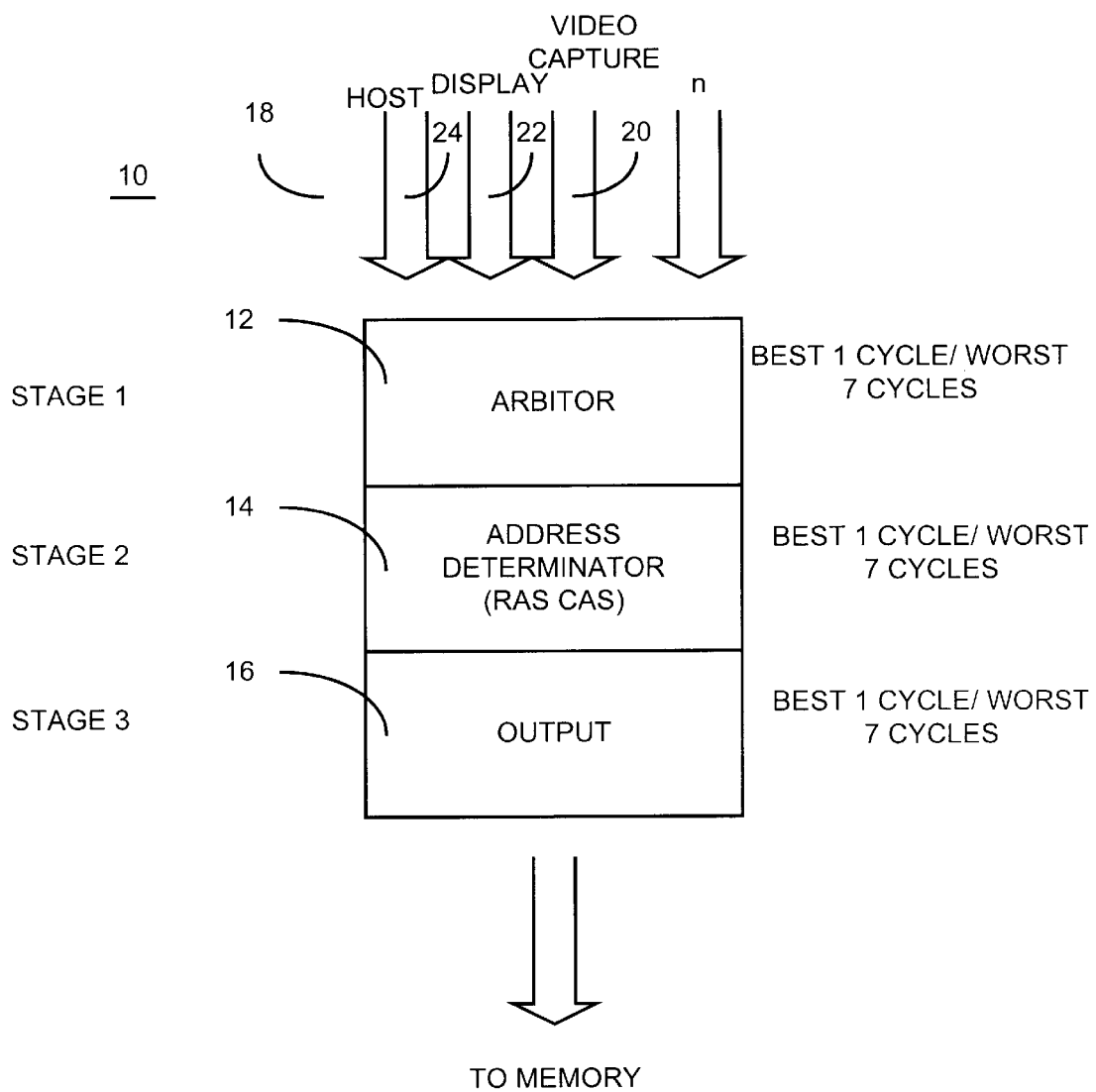
FIG. 1 is a block diagram generally depicting a prior art single pipeline processing system used in a memory controller.

FIG. 1 shows a block diagram of an example of a single pipeline processing system 10 having three stages that are used in conventional memory controllers for VGC's. The first stage is an arbitration stage 12 having an arbitor. The second stage is an addressing unit or address determination stage 14, such as a RAS CAS separation (row access and column access) stage. The third stage is a conventional output stage 16. The arbitration stage 12 receives multiple input request signals generally shown as 18. Two of the input request signals are real time request signals. These are the video capture request signal 20 and a display refresh request signal 22. Some of the input signals are non-real time signals. One non-real time request signal 24, may be a host request such as a peripheral component interconnect (PCI) request to write text to the display. Other non-real time input signals (not shown) are also input into the arbitration stage 12.

The arbitration stage 12 is a well known stage containing an arbitor with priority selection logic and multiplexing logic. The arbitor processes one of the input request signals 20–24 in one memory clock cycle. Once selected, the input signal is passed to the address determination stage 14 where the row and column address of memory is determined along with the data to be written or read. The address and data are then passed to the output stage where the memory access timing cycles are generated and data are output to memory. In the case of a page fault, a memory access takes seven clock cycles to complete. In a pipeline process, a new request for data to the pipeline processing system 10 from a requester, such as a video capture controller, has to wait for a previous request to be fully processed through the pipeline before it has access to memory. The whole pipeline stalls for seven cycles when a page fault occurs, because the output stage must wait the seven cycles before outputting the address and data information. If every request in the pipeline has a page fault, the whole pipeline can stall for a maximum of twenty-one cycles before a new request to the pipeline processing system 10 can access memory. This results in an extrinsic memory access latency period of twenty-one cycles. In other words, a worst case condition assumes each access request has a page fault with respect to one another.

With such systems, the total memory access latency period can be 28 memory clock cycles. The total memory access latency period includes an extrinsic latency period of twenty-one memory clock cycles (maximum) resulting from clearing all of the pipeline stages. The total memory access latency period also includes an intrinsic latency period of seven memory clock cycles (maximum).

Although conventional memory controllers can accommodate multiple real time signals and multiple non-real time signals, a real time request signal may be prevented from being processed for a maximum of twenty eight clock cycles. With real time video information, this delay can be too long and data can be lost. Although each real time requestor usually has some FIFO memory associated with it, and the FIFO memory can relieve some pressure on the latency problem, additional FIFO memory is costly and integrated circuit real estate is at a premium.

Figure 2:
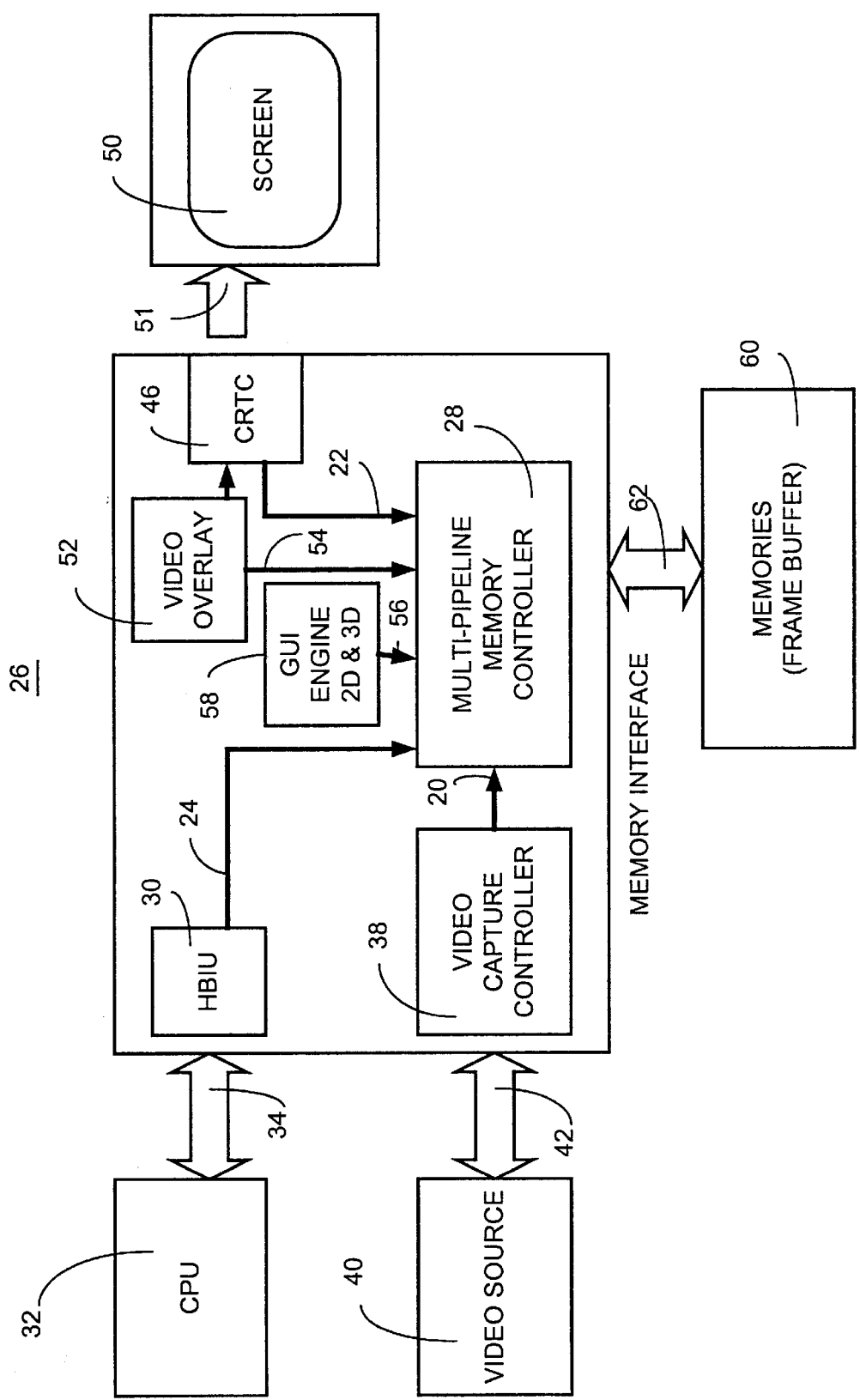
FIG. 2 is block diagram generally depicting one embodiment of a VGC chip incorporating a multiple pipeline memory controller in accordance with the invention.

Referring to FIG. 2, there is generally shown an embodiment of an improved VGC 26 with a multiple pipeline memory controller 28 in accordance with one embodiment of the invention. The VGC 26 may be an integrated circuit on a graphics card for insertion into a slot in a personal computer. It will be recognized that although the invention will be described for use in a VGC, it is contemplated that the invention may used in other suitable applications. The VGC 26 includes a host bus interface unit (HBIU) 30 as known in the art, coupled to a CPU 32, such as an Intel Pentium type processor, through PCI bus 34. The HBIU 30 communicates non-real time host input request signal 24, such as display text requests, to the multiple pipeline memory controller 28.

The VGC 26 also has a video capture controller 38 as known in the art, that receives video information from a video source 40 through video bus 42. The video source 40 may be a CATV signal. The video capture controller 38 generates real time video capture input request signals 20 for processing by the multiple pipeline memory controller 28. A CRT controller 46 generates a real time display refresh input request signal 22 and outputs the received display data on screen 50 through display bus 51. A video overlay engine 52 generates a non-real time input request signal 54 to the multiple pipeline memory controller 28 to request video information to overlay on graphics on the screen 50. The video overlay engine 52 scales a video image that is displayed and overlaid on graphics. In this way, movies or television programs can be viewed simultaneously with computer graphics.

Another non-real time input signal 56 is generated by a GUI engine 58. The multiple pipeline memory controller 28 receives the real time and non-real input signals and accesses memories 60 (frame buffer) containing graphic and video image data through a shared memory interface bus 62.

Figure 3:
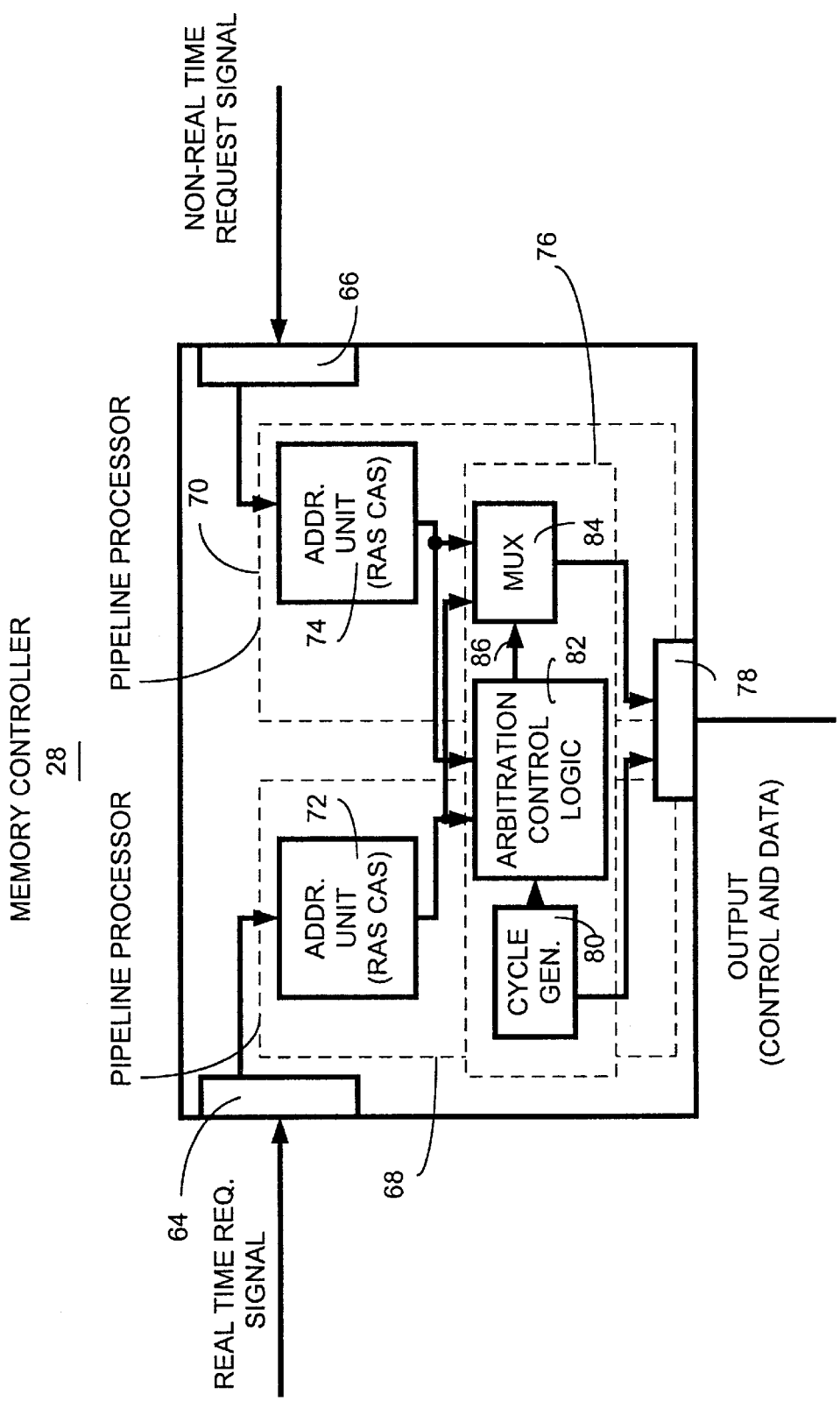
FIG. 3 is a block diagram generally depicting one embodiment of a multiple pipeline memory controller in accordance with the invention.

FIG. 3 shows a more detailed view of an embodiment of the multiple pipeline memory controller 28. Generally stated, the multiple pipeline memory controller 28 for servicing real time data has a plurality of dual stage pipeline processors as generally indicated. An input port 64 receives a real time input signal, such as video capture signal 20 or display refresh signal 22, in a pipeline fashion. As used herein, an input signal whether a real time or non-real time signal, may be a request signal with data, control information and address information or any combination thereof or singular component. Another input port 66 receives a non-real time input signal, such as a PCI request signal 24 or a video overlay request signal 54, also in a pipeline fashion.

One of the dual stage pipeline processors 68 receives a single real time input signal through the input port 64. The dual stage pipeline processor 68 separately processes the real time input signal in a pipeline fashion and is dedicated to the real time input signal. Like the dual stage pipeline processor 68, the other dual stage pipeline processor 70 receives the non-real time input signal through corresponding input port 66. The dual stage pipeline processor 70 also separately processes the non-real time input signal in a pipeline fashion.

A first stage of the dual stage pipeline processor 68 has first stage addressing logic with memory row/column address determination logic (R/C ADL) and memory page fault detection logic referred to as an addressing unit 72. As used herein, each memory row is a page. The addressing unit 72 is substantially the same as the addressing unit of the determinator stage 14 (FIG. 1), namely RAS CAS with fault detection provision. Similarly, the dual stage pipeline processing stage 70 has a first stage of addressing logic with memory row/column address determination logic (R/C ADL) and memory page fault detection logic referred to as addressing unit 74. The addressing unit 74 is the same as the addressing unit 72.

The second stage of the dual pipeline processors 68 and 70 is an output stage and has priority based arbitration logic 76 for selectively determining which of the real time and non-real time input signals output from each of the respective addressing unit 74 and the addressing unit 72 is to be output to memory 60 through an output port 78. Preferably, the arbitration logic 76 is common to both pipeline processors 68 and 70.

The arbitration logic 76 is substantially similar to the arbitor 12 of FIG. 1. The arbitration logic 76 has a memory clock cycle generator 80 for generating clock cycles to be used for accessing memories 60 and for timing of the arbitration control logic 82.

The arbitration control logic 82 receives control signal information output from each of the respective addressing unit 74 and the addressing unit 72. Data and address information from the addressing unit 74 and the addressing unit 72 is received by a multiplexer (MUX) 84 and serve as inputs to the MUX 84. The data and address information is multiplexed as output to the memory 60 through output port 78. The arbitration control logic 82 controls the MUX 84 by control signal 86 to output the higher priority signal between either the addressing unit 72 and the addressing unit 74. The real time request signal processed by the addressing unit 72 is given priority over the processed non-real time request signal from addressing unit 74 to avoid loss of real time information. Therefore a conflict between a read/write request between a real time request and a non-real time request will be resolved in favor of the real time request.

Figure 4:
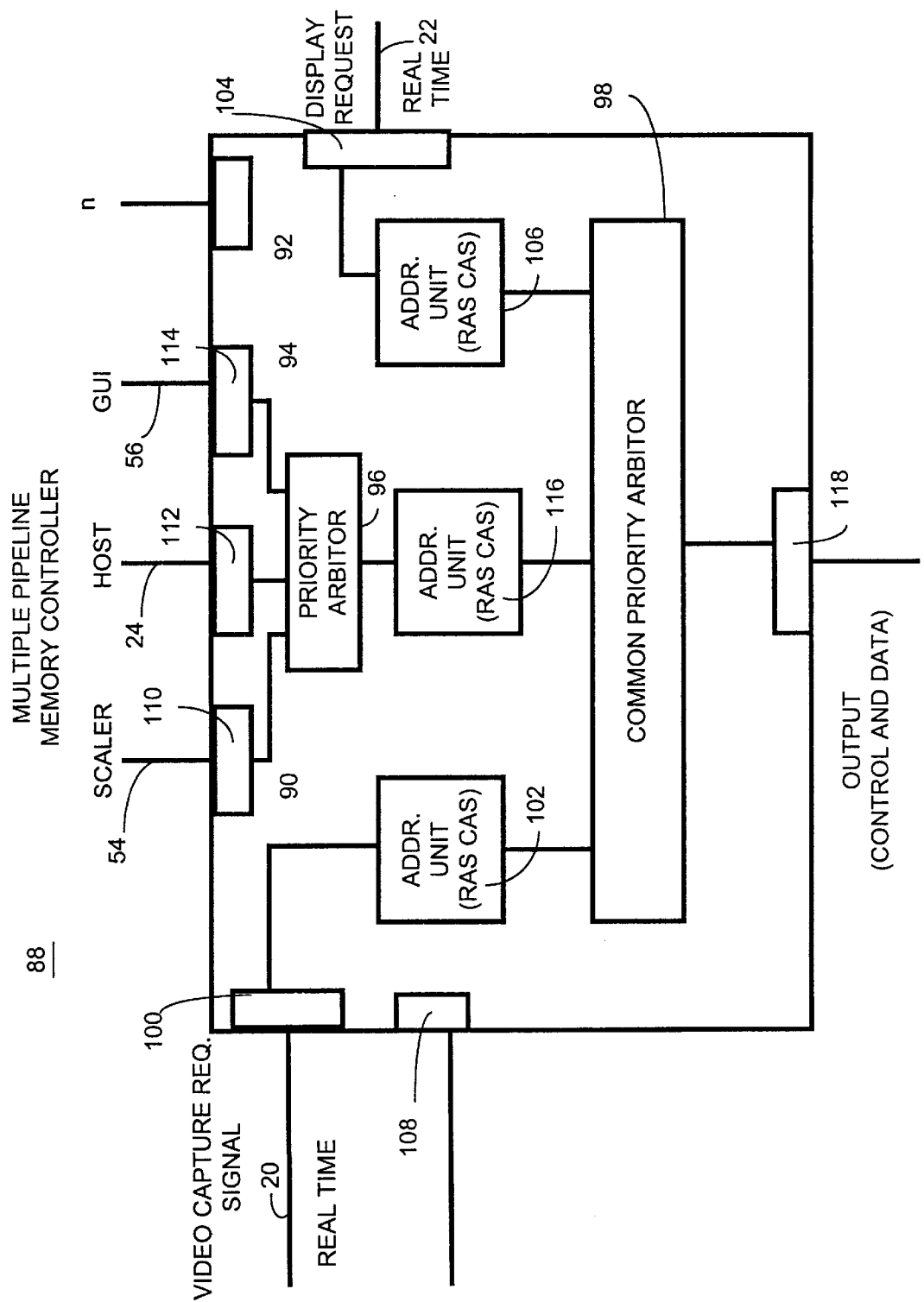
FIG. 4 is a block diagram generally depicting another embodiment of a multiple pipeline memory controller in accordance with the invention.

FIG. 4 shows a preferred embodiment of a multiple pipeline memory controller 88 having three pipeline processors 90, 92 and 94 for separately processing a number of input signals. Each real time input signal is sent through a dedicated dual stage pipeline processor 90 and 92 that separately processes a single real time input signal to effect rapid processing of real time request signals. All non-real time input signals are passed through a three stage pipeline processor 94 having dual arbitration logic by virtue of priority arbiter 96 and common arbiter 98.

A real time video capture request input signal 20 is received by the multiple pipeline memory controller 88 through a dedicated input port 100 in a pipeline fashion. The pipeline processor 90 receives the real time video capture request input signal 20 in dedicated first stage addressing unit 102. The first stage addressing unit 102 is the same logic as the first stage addressing unit 72.

Similarly, a real time display refresh request signal 22 is received by another dedicated pipeline processor 92 through a dedicated input port 104 in a pipeline fashion. The pipeline processor 92 receives the real time display refresh request input signal 22 in separate first stage addressing unit 106. The first stage addressing logic 106 is the same logic as the first stage addressing unit 102. Each pipeline processor 90 and 92 has a second stage that is an output stage. The output stage is the common arbitor 98. The common arbitor 98 is priority based arbitration logic like that of arbitration logic 76 (FIG. 3) but includes an additional real time input that is prioritized.

It will be recognized by those of ordinary skill in the art, that if additional real time input signals are used, additional dedicated input ports 108 and additional dedicated pipeline processors can be used in the same way as pipeline processors 90 and 92 and that the arbitration logic 98 can be suitably expanded to accommodate some additional inputs.

The multiple pipeline memory controller 88 also includes a plurality of input ports 110, 112, and 114 for receiving a plurality of non-real time input signals in a pipeline fashion through a dedicated three stage pipeline processor 94. A first stage of the pipeline processor 94 is priority based arbitration logic 96 connected to receive the plurality of non-real time input signals from the plurality of input ports 110, 112 and 114. The priority arbitor 96 selects one of the non-real time input signals based on a priority determination and outputs the selected non-real time input signal to second stage addressing unit 116. The second stage addressing unit 116 is the same logic as the first stage addressing unit 102 and 106 of pipeline processors 90 and 92. Therefore, each of the dedicated pipeline processors 90, 92 and 94 has separate addressing units in the form of addressing logic with memory row/column address determination logic and memory page fault detection logic.

As with the first stage addressing units 102 and 106, the second stage addressing unit 116 outputs a signal to the common arbitor 98 which is the third stage of pipeline processor 94. Therefore, the priority based common arbitor 98 is a final stage for all three dedicated pipeline processors 90, 92 and 94. The priority based common arbitor 98 selectively determines which of the real time and non-real time input signals is to be output to memory 60 through output port 118, by giving the real time display refresh request signal 22 first priority, giving the real time video capture request signal 20 second priority and giving the non-real time inputs 110, 112 and 114 last priority.

The multiple pipeline memory controller 88 is preferably manufactured as integrated circuitry incorporated in a video graphics controller chip for computers. It is preferable that any real time input signal be processed by a dedicated two stage pipeline processor as disclosed, however, it will be recognized that if desired, pipeline processors having more than two stages may be suitable.

By having multiple pipeline processors each dedicated to separately process a respective real time input signals, the real time request signal will always be quickly processed irrespective of the number of real and non-real input signal requests that the memory controllers 28 and 88 must process since the need for a first stage arbitor of real time signal inputs is substantially eliminated. This improves memory access latency for real time signals. Moreover, the architecture of the memory controllers 28 and 88 has an improved real time signal memory access latency due to the preferred dual stage pipeline for real time input signals. Memory access conflicts can be significantly reduced. Also the non-real time signals are economically processed using a third and shared pipeline processor having first stage arbitration logic. Priority non-real time requests are processed prior to other less important non-real time requests.

The reduction in memory access latency from the separate multiple pipelines provides more effective use of display FIFO memory that can support higher resolution display. Consequently, additional costs and manufacturing complexity are reduced since additional FIFO memory need not be added even through additional real time inputs are added to the graphic control system.

Also, it will be recognized that the use of a dual stage multiple pipeline processing system as described above reduces the memory access latency period. With the disclosed configuration, extrinsic memory access latency can be reduced from twenty-one clock cycles to seven clock cycles to more efficiently service the real time request input signals. This reduction allows the same FIFO memory to receive nearly three times the information than previous memory controllers. It will be apparent that other advantages are also facilitated by the disclosed memory controller.

It should also be understood that the implementation of other variations and modifications of the invention in its various aspects will be apparent to those of ordinary skill in the art, and that the invention is not limited by the specific embodiments described. For example, each of the pipeline processing circuits can be independent such that each circuit has a separate RAS CAS circuit and separate output circuit. Also, the memory controller can have more than three pipeline processing circuits if additional input signals are used. Moreover, one or more of the pipeline processors may have more than two stages. It is therefore contemplated to cover by the present invention, any and all modifications, variations, or equivalents that fall within the spirit and scope of the basic underlying principles disclosed and claimed herein.

What is claimed is:

1. A memory controller for servicing real time data comprising:
   at least a first input port for receiving a real time request signal in a pipeline fashion;
   at least a second input port for receiving a non-real time request signal in a pipe line fashion;
   first pipeline processor, operatively coupled to the first input port, to separately process the real time request signal in a pipeline fashion wherein the first pipeline processor is a dual stage pipeline processor with a first stage addressing unit having addressing logic with first memory row/column address determination logic and first memory page fault detection logic;
   second pipeline processor, operatively coupled to the second input port, to separately process the non-real time request signal in a pipeline fashion; and
   wherein the first and second pipeline processors include an arbitrator to selectively determine which of the real time and non-real time request signals is to be output to memory.

2. The memory controller of claim 1 wherein the second pipeline processor includes a dual stage pipeline processor with first stage addressing unit having addressing logic having second memory row/column address determination logic and second memory page fault detection logic.

3. The memory controller of claim 1 wherein the arbitrator serves as a common final stage for the first and second pipeline processors.

4. The memory controller of claim 3 wherein the arbitrator includes memory cycle generation circuitry for controlling timing to access the memory.

5. The memory controller of claim 1 having a plurality of second input ports for receiving non-real time data, and further comprising priority based arbitration logic, operatively coupled between the plurality of second input ports and the second pipeline processor, for receiving a plurality of non-real time input data signals and for determining which of the non real time data signals is processed next by the second pipeline processor.

6. The memory controller of claim 5 wherein the arbitrator includes priority based arbitration logic, operatively coupled to a multiplexer, for controlling the multiplexer to output a selected signal to be output to memory.

7. The memory controller of claim 1 wherein the controller is integrated circuitry operatively used as a section of a video graphics controller for computers.

8. The memory controller of claim 1 wherein the real time request signal is a video request signal.

9. The memory controller of claim 8 wherein the real time request signal is a computer display control signal.

10. The memory controller of claim 1 wherein the non-real time request signal is a request signal from a central processing unit.

11. The memory controller of claim 1 wherein each of the first and second pipeline processors has a two stage pipeline process comprised of an address determination stage and an output stage.

12. The memory controller of claim 11 wherein the first pipeline processor facilitates an extrinsic memory access latency period of seven memory clock cycles for the real time input signal.

13. A memory controller for servicing real time data comprising:

at least a first and second input port for receiving first and second real time input signals in a pipeline fashion;

a plurality of input ports for receiving a plurality of non-real time input signals in a pipeline fashion;

first pipeline processor, operatively coupled to the first input port, to separately process the real time request signal in a pipeline fashion;

second pipeline processor, operatively coupled to the second input port, to separately process the non-real time request signal in a pipeline fashion;

first priority based arbitration logic, connected to receive the plurality of non-real time input signals from the plurality of input ports, for selecting one of the non-real time input signals based on a priority determination and outputting a selected non-real time input signal;

third pipeline processor, operatively coupled to receive the selected non-real time input signal from the priority based arbitration logic, to separately process the selected non-real time input signal in a pipeline fashion; and wherein the first, second and third pipeline processors include second priority based arbitration logic as a final stage for selectively determining which of the real time and non-real time input signals is to be output to memory.

14. The memory controller of claim 13 wherein the controller is integrated circuitry incorporated in a video graphics controller chip for computers.

15. The memory controller of claim 13 wherein each of the first, second and third pipeline processors are comprised of dedicated addressing units having first memory row/column address determination logic and first memory page fault detection logic.

16. The memory controller of claim 15 wherein the second priority based arbitration means is comprised of priority based arbitration logic, operatively coupled between the addressing logic of the first, second and third processors and the output port, for receiving at least one non-real time input data signal and a plurality of real time input data signals and for selectively determining a priority between the real time and non-real time input signals to be output to memory via the output port.

17. The memory controller of claim 14 wherein the controller is used in a video graphics card insertable into a computer slot.

18. The memory controller of claim 13 wherein the second priority based arbitration logic serves as a final stage for the first, second and third pipeline processors.

19. The memory controller of claim 18 wherein the second priority based arbitration means includes memory cycle generation circuitry for controlling timing to access the memory.

20. The memory controller of claim 13 wherein one of the real time input signals is a video request signal and another is a display request signal.

21. The memory controller of claim 13 wherein the first and second pipeline processors each facilitate an extrinsic memory access latency period of seven memory clock cycles for respective real time input signals.

* * * * *